C. W. MILLER.
PACKING FOR VALVES.
APPLICATION FILED JUNE 25, 1910.
985,618.
Patented Feb. 28, 1911.
2 SHEETS—SHEET 1.
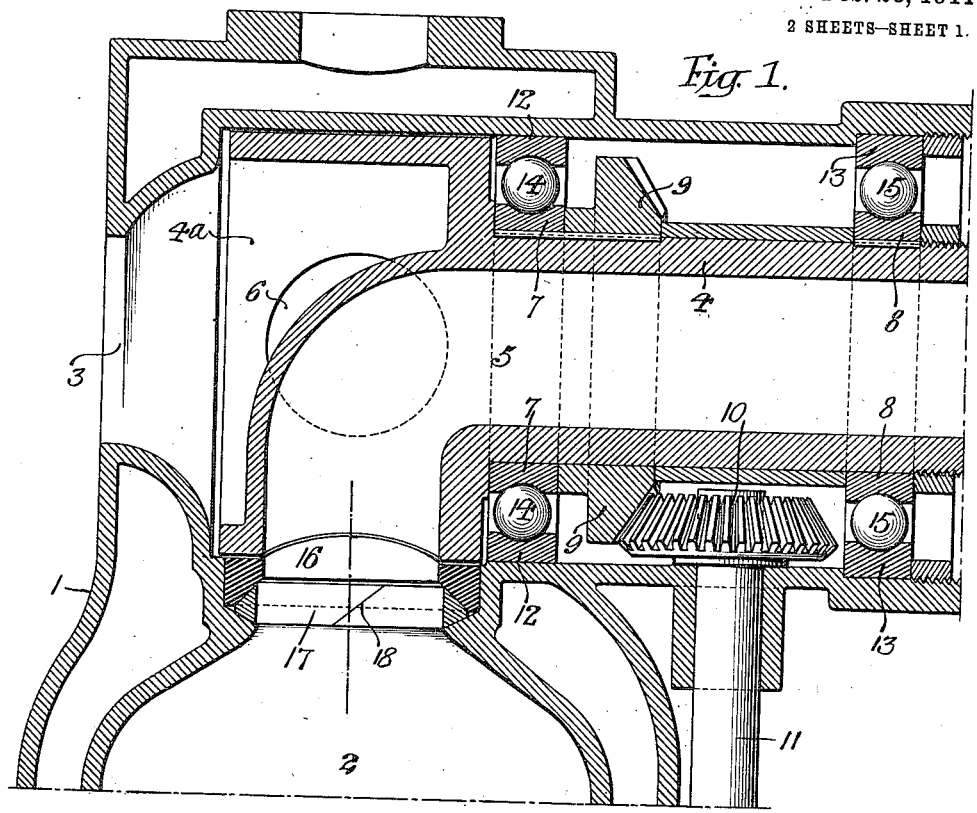
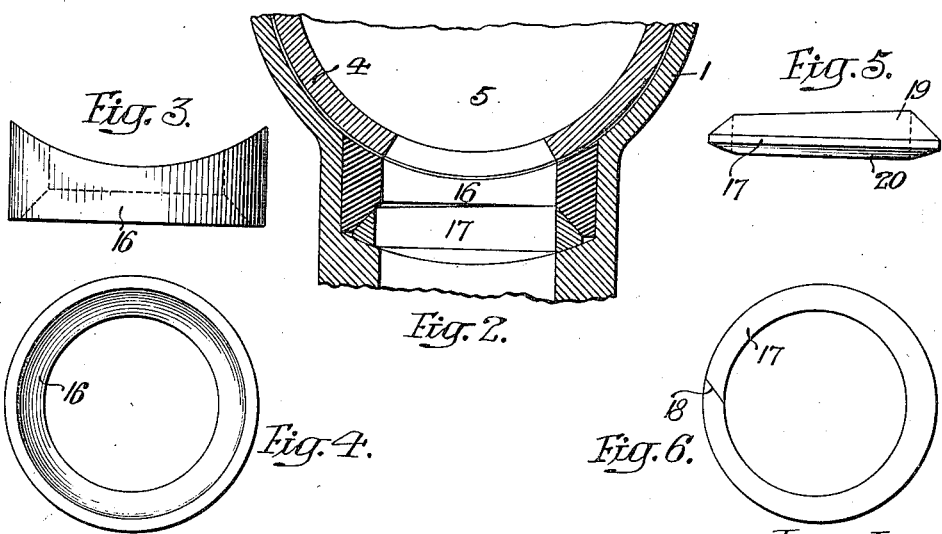
Witnesses
Walter Chism
Wills A. Burrows
Inventor
Caspar W. Miller
by his Attorneys
Howson & Howson C. W. MILLER.
PACKING FOR VALVES.
APPLICATION FILED JUNE 25, 1910.
985,618.
Patented Feb. 28, 1911.
2 SHEETS—SHEET 2.
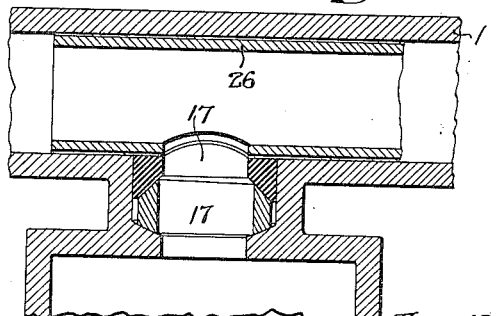
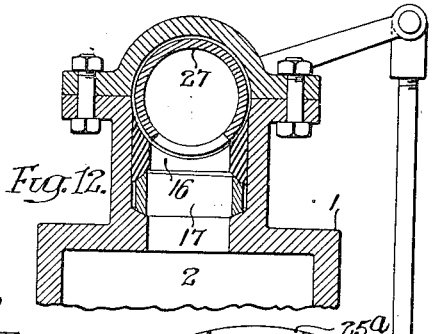
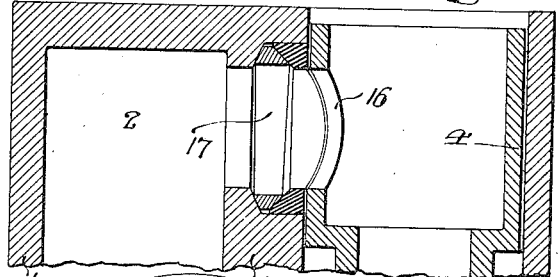
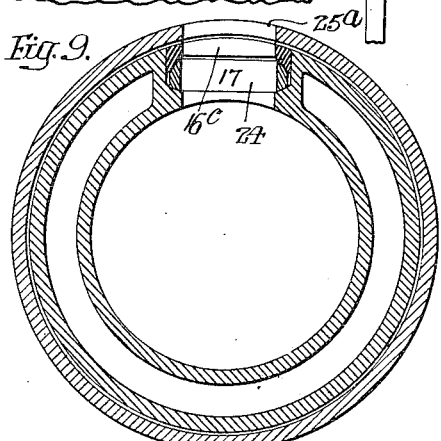
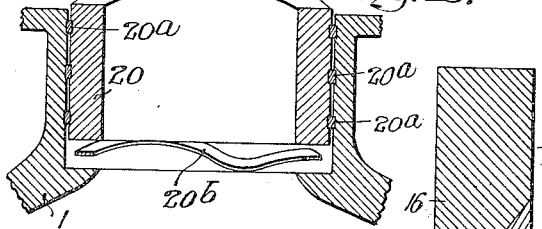
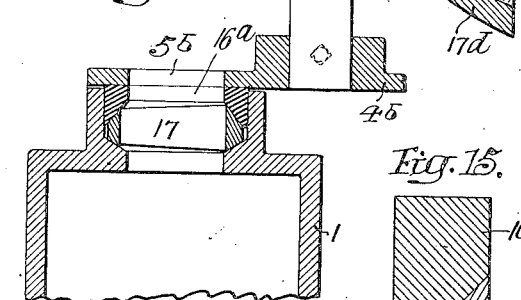
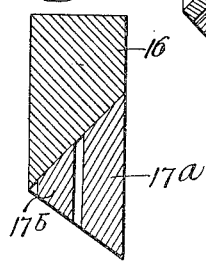
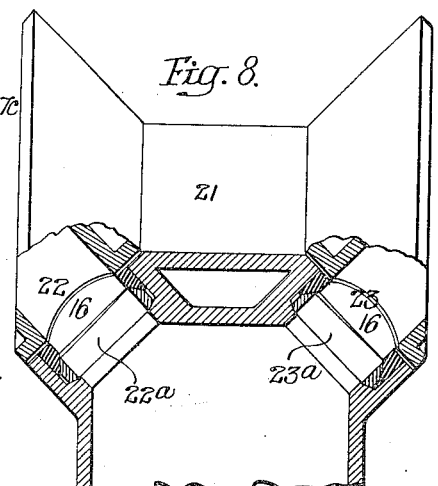
Witnesses—
Walter Chism
Nells A Burrows
Inventor—
Caspar W. Miller
by his Attorneys—
Howson & Howson

UNITED STATES PATENT OFFICE.

CASPAR W. MILLER, OF WALLINGFORD, PENNSYLVANIA.

PACKING FOR VALVES.

985,618.   Specification of Letters Patent.   Patented Feb. 28, 1911.

Application filed June 25, 1910. Serial No. 568,849.

*To all whom it may concern:*

Be it known that I, CASPAR W. MILLER, a citizen of the United States, and a resident of Wallingford, Delaware county, Pennsylvania, have invented certain Improvements in Packing for Valves, of which the following is a specification.

One object of my invention is to provide a valve particularly designed for use in internal combustion engines, which shall be of such construction and so arranged relatively to the parts with which it co-acts that it shall properly operate with a minimum of lubrication and likewise with a minimum of cutting or wear between itself and said parts.

I further desire to provide a valve for use in internal combustion engines with an automatically operative packing of such a nature that during the greater part of the operation of the engine it shall engage said valve with but relatively light contact, but which, when an explosion occurs and as long as there is gas under pressure in the cylinder, shall form a tight joint with the valve so as to prevent leakage of the gases around the same.

Another object of the invention is to provide an engine with a valve of the character above noted having automatically adjustable packing interposed between itself and the engine cylinder, whereby the valve is "packed" only at the time when such packing is necessary to prevent leakage of gases.

These objects and other advantageous ends I secure as hereinafter set forth, reference being had to the accompanying drawings, in which:—

Figure 1, is a vertical section of a portion of an internal combustion engine showing my invention as applied thereto; Fig. 2, is a slightly modified form of the invention; Figs. 3 and 4 are respectively a side elevation and a plan of one of the elements of the packing used; Figs. 5 and 6 are respectively a side elevation and plan of the other element of the packing employed; Figs. 7 and 8 are vertical sections illustrating the application of my invention to various forms of valves; Fig. 9 is a horizontal section of an engine cylinder showing the invention as applied for use in annular rotary valves; Figs. 10, 11, and 12 are vertical sections of portions of engine cylinders illustrating respectively the application of my invention thereto when rotary, reciprocating and oscillatory valves are employed, and Figs. 13, 14 and 15 are fragmentary vertical sections illustrating special forms of the packing employed as part of my invention.

In Fig. 1 of the above drawings, 1 represents a portion of the cylinder casing of an internal combustion engine; the combustion space of which is indicated at 2. This casting is provided with an exhaust outlet 3 and has revolubly mounted within its top portion a rotary valve 4 for controlling the passage of fuel to and the flow of products of combustion from said cylinder. The upper end of the combustion space has a circular opening so placed as to be capable of communicating with one end of the passage 5 of the valve structure 4 as well as with an opening 6 formed in the cylindrical surface of said valve 4. This latter is permanently connected with the exhaust opening 3 through the open head of the valve. The passage 5 of the valve is likewise in communication with a carbureter or other source of fuel or fluid under pressure, as the case may be, and there is fixed to the outside surface of said valve two ball races 7 and 8 and a beveled gear 9; the latter meshing with a second gear 10 fixed to a shaft 11 driven preferably from the engine shaft. A second pair of ball races 12 and 13 is suitably mounted on the cylinder casing and two sets of balls 14 and 15 are interposed between the races 7 and 12 and 8 and 13 respectively, so that the valve 4 is free to rotate without frictional engagement with any part of the cylinder casing.

The opening from the interior of the cylinder has a packing designed under certain conditions to coöperate with the valve 4 and which consists of two rings preferably constructed as shown in Figs. 3 to 6 inclusive. The first of these rings, as indicated at 16, has one face so designed as to be capable of fitting against the cylindrical outside surface of the valve 4, while its opposite face is interiorly beveled so as to be conical in form and coöperates with the second ring 17. While the ring 16 is endless and unexpansible, the ring 17 is split as indicated at 18, and has one convex conical face 19 capable of fitting into the concave portion of the ring 16 while its other face is likewise convex and is preferably formed as part of a spherical surface as indicated at 20; the cylinder casing being recessed for the reception of the two rings and having the bottom of said recess curved to conform with the spherical surface of the ring 17 so as to permit of a slight universal movement of the packing. This provision is made in case the valve 4 under operating conditions should be so loose as to have a slight "wabble" during its revolution.

It is to be noted that the enlarged head $4^a$ of the valve 4, in which are formed the openings 6 and 5, does not, under operating conditions, engage the interior cylindrical surface of the cavity in which it turns, although it is lightly engaged by the packing ring 16. Whenever there is gas under pressure within the cylinder, however, said gas acts on the interior surface of the expansible ring 17, forcing this outward at right angles to the long axis of the cylinder and causing it to slide upon the inclined face of the cavity in the cylinder casing in which it is mounted, and also upon the beveled surface of the ring 16. This latter is thus practically instantaneously caused to move toward the valve 4 and into close engagement with the cylindrical surface thereof; its pressure upon said surface being proportional to the pressure of the gases acting on the ring 17. The escape of the gas from the cylinder is thus effectually prevented until the valve has been turned by the shaft 11 and gear wheels 10 and 9 sufficiently to bring the exhaust opening 6 into communication with the openings through the rings 17 and 16, whereupon the products of combustion in the cylinder pass out through said openings and the exhaust passage 3. The immediate fall of pressure on the ring 17 permits this latter to contract, since it is preferably made of some resilient material capable of performing this function, whereupon the ring 16 falls away from close engagement with the valve 4, which is again left free to revolve with but the slight frictional engagement of said ring together with that of its supporting ball bearings and whatever form of coupling may be employed to join it to the fuel supply system. The ring 16 may be made out of any material capable of resisting the high temperature to which it is exposed and otherwise suitable for fulfilling the functions of a packing.

In some cases, as shown in Fig. 15, the interior packing ring may be made in two separate parts $17^a$ and $17^b$ concentric with each other and spaced apart; both of these rings being split and designed to act under operating conditions in conjunction with the space between them as a double packing to still further assist in preventing leakage. As is obvious, the ring 17 when expanded does not exactly fit the spherical surface of the recess in which it is mounted and is therefore in some cases open to objection on account of the possibility of leakage under these conditions. In order to prevent this I may provide a main ring $17^c$ split like the ring 17, as shown in Fig. 14, and mount between one edge of this and the cavity in which it is placed, an unsplit ring $17^d$ of suitable material having its bottom surface spherical so as to properly fit the adjacent surface of the cylinder casting, and its upper surface conical, in order that it shall likewise fit the under surface of the ring $17^c$ regardless of whether this is in its normal or in its expanded position. As the equivalent of the two packing rings shown in the figures above referred to, I may mount between the valve 4 and the cylinder, a sleeve 20 of generally cylindrical form and constructed at one end to fit the cylindrical surface of the portion $4^a$ of the valve 4. This sleeve loosely fits the passage leading from the cylinder and is provided with a number of piston rings $20^a$ designed to prevent leakage around it in the well known manner. Its lower end, however, is normally spaced away from the bottom of the cavity in which it is mounted by means of a light spring $20^b$, so that under operating conditions when an explosion occurs in the cylinder, the pressure of the gases on the lower edge of the sleeve forces it into close engagement with the cylindrical surface of the valve 4, thereby forming a tight joint at the time when such a tight joint is needed; its pressure against the valve being proportional, as in the case of the packing rings 16 and 17, to the pressure of the gases.

While in Fig. 1, I have shown my invention as applied to one form of rotary valve, mounted at the top of an engine cylinder, it may, if desired, be mounted at the side thereof as shown in Fig. 10; the relative arrangement of the parts being the same as explained in connection with Fig. 1. Instead of having a rotary cylindrical valve, I may provide a disk $4^b$ mounted on a suitable driving shaft $11^a$ and having through it a hole $5^b$ capable of registering with the opening through the packing rings $16^a$ and 17. As in the case of the cylindrical valve 4, the disk $4^b$ normally has but light contact with the packing ring $16^a$ whose face adjacent to it is in this case plane. When, however, an explosion occurs in the engine cylinder, the action of the packing rings, as previously explained, is such as to make a tight joint between the cylinder and the valve which at other times is free from frictional engagement with the cylinder structure.

In Fig. 8, I have shown my invention designed to provide a partially balanced valve, for in this case the engine cylinder is provided with a revolving double valve 21 whose general form is that of a cylinder having flaring, conical ends or heads. This structure is supported in any suitable bearing and its two heads have two openings 23 respectively designed for the inlet of fuel and the outlet of products of combustion. The cylinder has two openings 22ª and 23ª placed to be capable of coöperating with the two openings 22 and 23 and in each of them is mounted a pair of packing rings 16 and 17 similar in construction and operation to those described in connection with Fig. 1. When an explosion occurs, the pressure against the head of the structure 21 having the opening 22, includes a component which is balanced by a component of the force acting on the other head, so that to some extent this form of the valve is balanced. As shown in Fig. 9, I may construct the cylinder with one or more of its openings at the side, as indicated at 24, and surround that portion of said cylinder having said opening with a valve ring 25 provided with an opening 25ª capable of registering with the opening 24, in which case the packing rings 16ᶜ and 17 operate as before described. If desired, the valve controlling the inlet or outlet of gases from the engine cylinder may be reciprocatory as shown at 26 in Fig. 11 or may be oscillatory as shown at 27 in Fig. 12. In any case, however, one or more packing rings are employed, mounted to normally engage it with but a relatively light pressure, but which when the explosion occurs, are substantially instantaneously forced into engagement with the valve so as to make a tight joint therewith.

As a result of the above noted construction, practically all cutting of the valve is avoided and there is but little requirement for the lubrication which would otherwise be required if the valve surface was in heavy rubbing contact with any other structure. Moreover, the power required for the operation of the valve is materially diminished, especially since it is possible to mount it in anti-friction bearings which constitute its sole means of support. Further, the packing rings may be easily removed and replaced whenever desired and are so arranged that their pressure upon the valve is practically dependent upon and proportional to the pressure of the gases which they are required to confine. Moreover the packing is of such a nature as to automatically take up what little wear may occur and to properly perform its functions even if the valve should become warped or slightly out of true. It is to be noted that while I have shown my device as employed in connection with an internal combustion engine, it may be used with equal advantage and without departing from my invention in other types of engines as well as in other machines requiring packing.

While for practical reasons the packing, when there is no pressure in the cylinder, bears lightly upon the valve with a pressure insufficient to pack it, it is conceivable that it may, under certain conditions be wholly free from the valve and engage it as above described when pressure exists in said cylinder. It is therefore to be understood that such an arrangement may be employed without departing from my invention and as the equivalent thereof.

By the term "light" as employed to designate the nature of the engagement between the packing and the valve I mean such a contact as would of itself be insufficient to prevent leakage of fluid under pressure between said members, while by "close" or "intimate" I mean such an engagement as causes the packing to properly fulfil its function and prevent escape of fluid.

I claim:—

1. The combination of a container; a relatively movable valve therefor; with packing between the valve and the container for preventing leakage of fluid under pressure; said packing normally bearing on the valve with a pressure insufficient to pack it, but being free to move under the action of fluid under pressure within the container to prevent leakage.

2. The combination of a container having an opening; a valve mounted to control the flow of fluid through said opening; with an automatically acting packing mounted adjacent to the container opening for preventing the escape of fluid under pressure around the valve and normally in light engagement with said valve.

3. The combination of a container having an opening; a relatively movable valve for controlling the flow of fluid through said opening; and packing placed to prevent escape of fluid under pressure around the valve; said packing having a portion exposed to the action of the fluid and being free to automatically move to form a tight joint between the valve and the container.

4. The combination with a container having an opening; of a relatively movable valve also having an opening placed to periodically coöperate with the opening of the container; with packing mounted in the container structure and free to move into close engagement with the valve under the action of fluid under pressure; said packing being normally in relatively light engagement with the valve.

5. The combination of a container having an opening; a valve also having an opening and mounted to coöperate with the opening of the container; and packing for preventing escape of fluid around the valve; said packing consisting of a plurality of elements of which one is normally in but relatively light engagement with the valve but is free to move into close engagement therewith under the action of gases under pressure to prevent leakage.

6. The combination of a container having an opening; a relatively movable valve placed to coöperate with said opening; and two packing rings for the opening; one of said rings being free to engage the valve but normally in but relatively light contact with the same; and the other ring being expansible under the action of fluid under pressure and in position to act on the first ring to move the same.

7. The combination of a container having an opening; a relatively movable valve mounted adjacent thereto and having an opening placed to coöperate with the opening of the said container; a packing ring substantially concentric with the container opening and free to move into close engagement with the valve; and a second packing ring free to expand and having an inclined portion placed to coöperate with an inclined portion of the first ring.

8. The combination of a container having an opening; a rotary valve also having an opening placed to coöperate with the opening of the container; bearings supporting said valve normally out of engagement with the container structure; and an automatic packing placed between the valve and the container and normally in but relatively light engagement with said valve.

9. The combination of a container having an opening and a packing recess substantially concentric therewith; a plurality of packing rings in said recess of which one is inexpansible and the other is split so as to be expansible; said rings having co-acting portions inclined to the line of the opening; one of the rings having a spherical surface to permit of a limited universal movement; with a relatively movable valve for controlling the flow of fluid through the opening placed to be closely engaged by the packing under predetermined conditions though normally in but light engagement with the same.

10. The combination with a container having an opening; of a relatively movable valve therefor; and packing between the container and the valve; said packing including a relatively inexpansible ring free to engage the valve and having a conical surface; with a second ring free to expand under internal pressure and of a substantially wedge shaped section.

11. The combination of a container having an opening and provided with a packing recess substantially concentric with said opening having a spherically curved bottom portion; packing rings mounted in said recess of which one is provided with a surface inclined to the line of the opening, and the other has a similarly inclined surface coacting with the inclined portion of the first ring; said second ring being made in two expansible sections of which one is curved to engage with the spherical portion of the recess; and a relatively movable valve having an opening placed to coöperate with the cylinder opening and normally in but relatively light engagement with the packing.

12. The combination of a container having an opening; a relatively movable valve for controlling the flow of fluid through said opening; with a longitudinally movable sleeve co-axial with the opening, having one end in relatively light engagement with the valve and having its opposite end exposed to the action of fluid under pressure from said container.

In testimony whereof, I have signed my name to this specification, in the presence of two subscribing witnesses.

CASPAR W. MILLER.

Witnesses:
 WILLIAM E. BRADLEY,
 WM. A. BARR.